United States Patent
Nungesser et al.

(10) Patent No.: US 8,530,362 B2
(45) Date of Patent: Sep. 10, 2013

(54) LEATHER COATING COMPOSITIONS HAVING IMPROVED EMBOSSABILITY

(75) Inventors: Edwin H. Nungesser, Horsham, PA (US); Yujian You, Collegeville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1100 days.

(21) Appl. No.: 12/456,905

(22) Filed: Jun. 24, 2009

(65) Prior Publication Data

US 2010/0003876 A1 Jan. 7, 2010

Related U.S. Application Data

(60) Provisional application No. 61/133,982, filed on Jul. 3, 2008.

(51) Int. Cl.
*B32B 5/02* (2006.01)
*B32B 27/04* (2006.01)
*B32B 27/12* (2006.01)

(52) U.S. Cl.
USPC ........... 442/102; 442/104; 442/134; 442/154; 526/221

(58) Field of Classification Search
USPC .................................. 442/102, 104, 134, 154
See application file for complete search history.

(56) References Cited

U.S. PATENT DOCUMENTS

| 4,150,005 A | 4/1979 | Gehman et al. |
| 4,517,330 A | 5/1985 | Zdanowski et al. |
| 4,654,397 A | 3/1987 | Mueller-Mall et al. |
| 5,149,745 A | 9/1992 | Owens et al. |
| 5,162,415 A | 11/1992 | Rehmer et al. |
| 5,185,387 A | 2/1993 | Klesse et al. |
| 5,324,772 A | 6/1994 | Schmidt-Thuemmes et al. |
| 5,356,968 A | 10/1994 | Rupaner et al. |
| 5,744,540 A | 4/1998 | Baumstark et al. |
| 6,020,413 A | 2/2000 | Wolff et al. |
| 6,031,038 A | 2/2000 | Baumstark et al. |
| 6,262,144 B1 | 7/2001 | Zhao et al. |
| 6,471,885 B2 | 10/2002 | Chiang et al. |
| 2004/0097644 A1 | 5/2004 | Katou et al. |
| 2005/0202176 A1 | 9/2005 | Brady et al. |
| 2005/0288411 A1 | 12/2005 | Eichman et al. |
| 2006/0205865 A1 | 9/2006 | Kim et al. |
| 2006/0252878 A1 | 11/2006 | Razdik et al. |

FOREIGN PATENT DOCUMENTS

| EP | 1 160 335 B1 | 9/2003 |
| EP | 1 275 693 B1 | 1/2006 |
| EP | 1 704 849 A1 | 9/2006 |
| WO | WO 2006/059352 A1 | 6/2006 |

*Primary Examiner* — Lynda Salvatore
(74) *Attorney, Agent, or Firm* — Andrew E. C. Merriam

(57) ABSTRACT

The present invention provides aqueous compositions of one or more divalent metal crosslinked aqueous carboxylic acid group containing acrylic polymer having a Tg of $\leq 10°$ C. and one or more acrylic oligomer of a molecular weight of 20,000 or less and having a glass transition temperature (Tg) of equal to or lower than the Tg of the aqueous carboxylic acid group containing acrylic polymer. IN addition, the present invention provides methods of forming such compositions by polymerizing the aqueous carboxylic acid group containing acrylic polymer as a first stage of a multi-stage polymerization, followed by polymerizing the acrylic oligomer in the second or a subsequent stage by polymerizing the monomers in the in second or a subsequent stage in the presence of a chain transfer agent. Preferably, the compositions are used in soft feel applications to coat leather for, for example, furniture for home use and upholstery for automotive use.

10 Claims, No Drawings

LEATHER COATING COMPOSITIONS HAVING IMPROVED EMBOSSABILITY

This invention claims priority to U.S. Provisional Application No. 61/133,982 filed Jul. 3, 2008.

The present invention relates to aqueous emulsion polymer compositions for use in making soft feel coatings that exhibit low tack and excellent embossability, such as for leather, methods of making those compositions, coatings produced thereby. More particularly, the present invention relates to compositions of one or more divalent metal crosslinked aqueous acrylic emulsion polymer further comprising one or more acrylic oligomer having a glass transition temperature (Tg) of equal to or lower than the Tg of the aqueous acrylic emulsion polymer, and to methods of forming such compositions by polymerizing the aqueous emulsion polymer as a first stage of a multi-stage polymerization, followed by polymerizing the acrylic oligomer in the second or a subsequent stage by polymerizing the monomers in the in second or a subsequent stage in the presence of a chain transfer agent.

Known emulsion acrylic polymers for soft feel applications, such as for use in leather basecoats and colorcoats, contain copolymerized lower alkyl(meth)acrylates along with acid functional comonomers, such as acrylic acid (AA), and are crosslinked at their acid functions with zinc to lower their tack and improve their application performance. Attempts to increase zinc level in such emulsion polymers improves the embossing properties of the polymer, especially the resistance of the coating to cut through. However, increasing the zinc level adversely impacts the softness of the polymer, and the resulting flexing resistance and soft feel in the resulting coatings they produce.

U.S. Pat. No. 6,471,885 B2, to Chiang et al., discloses aqueous emulsion polymer compositions containing a multi-stage emulsion copolymer having a stage with a glass transition temperature (Tg) of less than 10° C. that contains a copolymerized carboxylic acid and which has been contacted with a divalent metal oxide, hydroxide or carbonate, the polymer having a second stage with a Tg of greater than 20° C. and which is prepared in the presence of from 1 to 15 wt. % of a chain transfer agent. The compositions provide embossable and somewhat soft coatings for leather. However, the second stage of the multi-stage aqueous emulsion copolymer is substantially harder than the first stage of the aqueous emulsion polymer and provides coatings that feel too hard and/or that have inadequate flexibility for soft feel applications. Desirably, the composition could be improved to provide coatings for leather coating applications demanding soft and flexible coatings.

The present inventors have endeavored to solve the problem of providing acrylic emulsion copolymers that provide soft feel and low tack coatings with good embossing properties, such as plate release, cut-through resistance and print quality, and physical performance for use in leather and flexible substrates.

STATEMENT OF THE INVENTION

The present invention provides compositions comprising one or more acrylic oligomer having a weight average molecular weight of 20,000 or less, preferably 10,000 or less, and one or more aqueous carboxylic acid group containing acrylic polymer having a glass transition temperature (Tg) of ≦10° C. (10° C. or less), or −50° C. or more, or, preferably, −20° C. or more, and that has been crosslinked with one or more divalent metal, such as, for example, a polymer comprising the polymerization product of one or more acrylic monomer and from 0.5 to 10 wt. % of one or more carboxylic acid group containing ethylenically unsaturated comonomer, based on the total weight of monomers polymerized to make the carboxylic acid group containing acrylic polymer, wherein the Tg of the acrylic oligomer is equal to or less than the Tg of the aqueous carboxylic acid group containing acrylic polymer, preferably, ≧10° C. less than the aqueous carboxylic acid group containing acrylic polymer. Preferably, the acrylic monomer used to make the aqueous carboxylic acid group containing acrylic polymer are chosen from ethyl acrylate (EA), butyl acrylate (BA), ethylhexyl acrylate (EHA), butyl methacrylate, ethylhexyl methacrylate, and mixtures thereof.

The aqueous carboxylic acid group containing acrylic polymer and acrylic oligomer may comprise a multi-stage copolymer in which the carboxylic acid group containing acrylic polymer is a first stage and acrylic oligomer is the second or final stage. The multi-stage copolymer may comprise one or more intermediate stage have a Tg higher than that of the carboxylic acid group containing acrylic polymer, such as, for example, a Tg of from 0 to 100° C.

Preferably, the divalent metal results from crosslinking the aqueous carboxylic acid group containing acrylic polymer with a divalent metal crosslinker chosen from a divalent metal oxide, divalent metal hydroxide, divalent metal carbonate, and mixtures thereof, More preferably, the divalent metal crosslinker is zinc oxide or hydroxide.

In addition, the present invention provides methods of making the inventive compositions, and, further, provides coatings produced by the inventive compositions.

The methods of forming the compositions comprise polymerizing as a first stage of a multi-stage polymerization an aqueous emulsion monomer mix containing one or more acrylic monomer and one or more carboxylic acid group containing ethylenically unsaturated monomer to form a carboxylic acid group containing polymer having a Tg of ≦10° C., followed in one or more second or subsequent stage by adding a second monomer mix comprising one or more chain transfer agent and one or more monomer and polymerizing the second monomer mix in the presence of the chain transfer agent to form one or more acrylic oligomer having a weight average molecular weight of 10,000 or less and a Tg equal to or less than the Tg of the carboxylic acid group containing acrylic polymer, and adding one or more divalent metal crosslinker and crosslinking the carboxylic acid group containing acrylic polymer.

Compositions of the present invention may be formulated into coating compositions that are applied to, for example, leather, paper, cardboard, paperboard, woven textiles, non-woven textiles, and plastics and dried to form coatings on those substrates. Preferably, the compositions are used in soft feel applications to coat substrates such as, for example, furniture for home us, furniture for automotive use, garments, and personal accessories.

Composition comprising one or more acrylic oligomer and one or more aqueous acrylic emulsion polymer that has been crosslinked with a divalent metal, wherein the Tg of the acrylic oligomer is equal to or lower than the Tg of the aqueous emulsion polymer can achieve an extremely soft and low tack polymer and coating produced with the polymer, having good embossing properties and physical performance, particularly flexing resistance. The present invention thus enables the provision of durable, soft feel coatings having excellent embossability, for example, those coatings for leather used to make furniture or upholstery.

All ranges recited are inclusive and combinable. For example, a proportion acid in an aqueous carboxylic acid group containing acrylic polymer of 0.5 wt. % or more, or 1.0 wt. % or more, or 5 wt. % or less, or 10 wt. % or less, includes ranges of from 0.5 to 10 wt. %, from 1.0 to 10 wt. %, from 0.5 to 5 wt. %, and from 1.0 to 5 wt. %.

Unless otherwise indicated, all pressure units are standard pressure (760 mm/Hg) and all temperature units are room temperature ~25° C.

All phrases comprising parenthesis denote either or both of the included parenthetical matter and its absence. For example, the phrase "(co)polymer" includes, in the alternative, polymer, copolymer and mixtures thereof; likewise, the phrase "(meth)acrylate" includes acrylate and/or methacrylate.

As used herein, the phrase "acrylic monomer" shall refer to any nonionic acrylic monomer, such as, alkyl or arylalkyl (meth)acrylate, alkyl(meth)acrylamide, (meth)acrylonitrile or modified forms thereof, such as, for example, alkoxylated alkyl(meth)acrylate; and shall refer to acidic acrylic monomers, such as (meth)acrylic acid and (meth)acrylamide.

As used herein, the phrase "acrylic polymer" or "acrylic oligomer" shall refer, respectively, to any polymer or oligomer that is the polymerization product of 50 wt. % or more, based on the total weight of monomers used to form the polymer, of any acrylic monomer.

As used herein, the phrase "aqueous" shall mean water or water mixed with 50 wt. % or less, based on the weight of the mixture, of water-miscible solvent.

As used herein, the phrase "polymer" shall refer to any or all of polymers, copolymers, terpolymers, tetrapolymers, pentapolymers or hexapolymers, and also to random, block and graft copolymers.

As used herein, unless otherwise indicated, the phrase "molecular weight" or "mw" refers to the weight average molecular weight of a polymer as measured by gel permeation chromatography (GPC) against a polystyrene standard.

As used herein, the phrase "nonionic monomer" means that the copolymer-ized monomer residue does not bear an ionic charge between pH=2 to 13.

As used herein, the phrase "low tack" shall refer to compositions which, when dried, form a film or coating having an acceptable, not too sticky feel to the touch.

As used herein, the phrase "resin" shall include polymers and copolymers.

As used herein, unless stated otherwise, the phrase "glass transition temperature" or "Tg" shall mean glass transition temperature measured by differential scanning calorimetry (DSC) taking the inflection point in the thermogram as the Tg value. In the case of either an acrylic oligomer or a first stage carboxylic acid group containing acrylic polymer that has a relatively hard intermediate stage, the reported Tg value is determined by measuring the DSC of the oligomer or polymer alone, either as produced separately from any other stage(s) of a multistage polymer or as separated therefrom.

As used herein, the phrase "wt. %" shall mean percent by weight.

The aqueous carboxylic acid group containing acrylic polymer and the acrylic oligomer may comprise a multi-stage copolymer having the carboxylic acid group containing acrylic polymer as a first stage and acrylic oligomer as the second or final stage. An optional intermediate stage polymer in the multi-stage copolymer may comprise a harder polymer, e.g., a styrene or methyl methacrylate copolymer with other nonionic acrylic monomers. Alternatively, the composition may comprise a blend of one or more aqueous carboxylic acid group containing acrylic polymer and one or more acrylic oligomer. The proportion of acrylic oligomer or acrylic oligomer stage of a multi-stage polymer, respectively, may range from 5 to 50 wt. % of the total weight of total polymer solids in the composition, preferably, 15 wt. % or more, or, preferably, 30 wt. % or less.

The aqueous carboxylic acid group containing acrylic polymer contains at least one copolymerized residue of one or more monoethylenically-unsaturated nonionic acrylic monomer such as, for example, alkyl and alkylaryl(meth)acrylic ester monomer, including methyl acrylate, ethyl acrylate, butyl(meth)acrylate, 2-ethylhexyl(meth)acrylate, decyl acrylate, methyl methacrylate, butyl methacrylate, acetoacetoxyethyl(meth)acrylate, acetoacetoxypropyl(meth)acrylate; and (meth)acrylonitrile. The carboxylic acid group containing acrylic polymer may further comprise the at least one copolymerization residue of one or more nonionic vinyl monomer, such as, for example, styrene or substituted styrenes, e.g. a-methyl styrene; butadiene; vinyl acetate or other vinyl esters; vinyl monomers such as vinyl chloride, vinylidene chloride, and N-vinyl pyrollidinone. The carboxylic acid group containing acrylic polymer also contains from 0.5 wt. % to 10 wt. %, preferably 1 wt. % or more, and, preferably, up to 5 wt. %, of a copolymerized carboxylic acid group containing ethylenically unsaturated comonomer, based on the weight of the carboxylic acid group containing acrylic polymer, such as, for example, (meth)acrylic acid, crotonic acid, itaconic acid, fumaric acid, maleic acid, monomethyl itaconate, monomethyl fumarate, monobutyl fumarate, and maleic anhydride.

Preferably, the carboxylic acid group containing acrylic polymer is substantially free from copolymerized multiethylenically-unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. By "substantially free from copolymerized multiethylenically-unsaturated monomers" herein is meant that levels less than 0.1% based on the weight of the carboxylic acid group containing acrylic polymer such as might be adventitiously introduced as impurities in monoethylenically-unsaturated monomers are not excluded from the polymer composition.

To insure that the inventive coating compositions give low tack coatings, the carboxylic acid group containing acrylic polymer or the corresponding stage of a multistage polymer to should have, when not crosslinked with divalent metal, a weight average molecular weight of from 200,000 to 10,000,000, preferably 300,000 or more, or, more preferably, 400,000 or more.

To form divalent metal crosslinks, the carboxylic acid group containing acrylic polymer is contacted with a divalent metal oxide, hydroxide, or carbonate at pH of 9 or less, preferably, at a pH of 3 or more, or a pH of 6 or less and at a temperature of 60° C. or less, or, preferably, 50° C. or less, or, preferably, 35° C. or more, in an amount greater than 0.2, or up to 1.0 equivalent of divalent metal per equivalent of copolymerized carboxylic acid monomer in the carboxylic acid group containing acrylic polymer, preferably 0.7 to 0.85 equivalents. Divalent metal amounts can be increased to improve low tack in softer carboxylic acid group containing acrylic polymers, such as, for example, any having a Tg of 0° C. or less. The oxides, hydroxides, and carbonates of transition metals such as zinc, aluminum, tin, tungsten, and zirconium are preferred for low cost, low toxicity, and low color in the dried coating. Zinc oxide is more preferred. The divalent metal oxide, hydroxide, or carbonate may be added slurried in water, optionally with an added dispersant such as, for example a low molecular weight polymer or copolymer of (meth)acrylic acid. The transition metal oxide, hydroxide, or carbonate may be added during the polymerization process or after the polymerization of one or more stages has been completed.

The acrylic oligomer may be formed of any acrylic or vinyl monomer, preferably nonionic acrylic or vinyl monomers. Because the acrylic oligomer has a far lower molecular weight than the carboxylic acid group containing acrylic polymer it will have a lower Tg than the carboxylic acid group containing acrylic polymer even when the polymer and the oligomer are made from the same monomer reactants. The Tg of the acrylic oligomer may be −100° C. or more, for example, −60° C. or more, or −40° C. or more. Accordingly, the acrylic oligomer of the present invention may comprise the polymerization of the same monomer mix that is used to form the carboxylic acid group containing acrylic polymer. However, acid functionality in an acrylic oligomer made as part of a multistage polymerization may inhibit polymerization. Preferably, the acrylic oligomer stage of a multistage polymer comprises the reaction product of less than 5 wt. % of any carboxylic acid group containing ethylenically unsaturated comonomer, based on the total weight of monomers used to form the acrylic oligomer.

The acrylic oligomer can be formed in a second or final polymerization stage of a multistage polymerization method wherein the carboxylic acid group containing acrylic polymer has been formed as the first stage, such that the second or final stage polymerization is conducted in the presence of one or more chain transfer agent. Alternatively, the acrylic oligomer can be formed separately by polymerization of one or more suitable acrylic monomer in the presence of one or more chain transfer agent and then blended with the carboxylic acid group containing acrylic polymer.

Chain transfer agents such as, for example, mercaptans are used in an amount effective to provide lower molecular weights of either a separate acrylic oligomer or the acrylic oligomer stage of a multi-stage copolymer comprising a carboxylic acid group containing acrylic polymer. Suitable chain transfer agents may be chosen from, for example, halogen compounds, such as tetrabromomethane; allyl compounds; or mercaptans such as alkyl thioglycolates, alkyl mercaptoalkanoates, and $C_4$-$C_{22}$ linear or branched alkyl mercaptans. Preferably, the chain transfer agent is a mercaptan, e.g. hexyl mercaptan, or more preferably, a mercaptan chosen from methyl 3-mercapto propionate (MMP), butyl 3-mercaptopropionate (BMP), mercaptopropionic acid, n-dodecyl mercaptan, ethylhexyl thioglycolate, and mixtures thereof. Chain transfer agents act as antioxidants to prevent yellowing. Suitable amounts of chain transfer agent range from 1 to 15 wt. %, or 10 wt. % or less, or 2 wt. % or more, or 5 wt. % or more, or, preferably 8 wt. % or less, based on the dry weight of the acrylic oligomer. Chain transfer agent(s) may be added in one or more additions or continuously, linearly or not, over all of, most of, or during limited portion(s) of the reaction period.

In the methods of making the compositions, the acrylic oligomer is formed in the presence one or more chain transfer agent. Chain transfer agent(s) may be added in one or more additions or continuously, linearly or not, over most or all of the entire reaction period or during limited portion(s) of the reaction period.

The polymerization techniques used to prepare the carboxylic acid group containing acrylic polymer, the acrylic oligomer or the aqueous multi-stage emulsion-polymer of the present invention are well known in the art such as, for example, that of U.S. Pat. Nos. 4,325,856; 4,654,397; 4,814,373; and 5,723,182. A monomer mix and any one or more surfactant, initiator, and/or reducing agent may be fed or charged into a reaction vessel and reacted. Preferably, to make the carboxylic acid group containing acrylic polymer or each stage of a multi-stage polymer, the vessel is charged with the whole of a monomer mix in a shot polymerization method that makes high molecular weight polymers. Alternatively, the acrylic oligomer may be made separately gradual addition of monomer mix to a reaction vessel, followed by blending the acrylic oligomer and the carboxylic acid group containing acrylic polymer.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction, and is, preferably from 30° C. to 90° C., or, more preferably 50° C. or more. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the above initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

In the multi-stage polymerization process according to the invention, at least two stages differing in composition are formed in sequential fashion. Each stage may comprise a monomer mix and any one or more surfactant, initiator, and/or reducing agent. Such a multi-stage process usually results in the formation of at least two distinct polymeric phases. The resultant multiphase structure of the polymer particles may be determined in various ways known in the art, such as, for example, via scanning electron microscopy using staining techniques to emphasize the difference between the appearance of the phases.

The aqueous coating composition may be prepared by techniques which are well known in the coatings art. First, at least one pigment is well dispersed in an aqueous medium under high shear such as is afforded by a Cowles™ mixer or, alternatively, at least one predispersed colorant is used. Then the multi-stage emulsion-polymer or acrylic oligomer carboxylic acid group containing acrylic polymer blend is added under low shear stirring along with other coating adjuvants, as desired. The aqueous coating composition may contain, in addition to any pigment(s), conventional coatings adjuvants such as, for example, emulsifiers, coalescing agents, curing agents, buffers, dullers, neutralizers, thickeners, rheology modifiers, humectants, wetting agents, biocides, plasticizers, antifoaming agents, colorants, waxes, and antioxidants.

The solids content of the aqueous coating composition may be from about 10% to about 50% by volume. The viscosity of the aqueous polymeric composition may be from 40 centipoise to 10,000 centipoise, as measured using a Brookfield viscometer; the viscosities appropriate for different application methods vary considerably.

The aqueous coating composition may be applied to leather such as, for example, mineral tanned or vegetable tanned leather including full-grain leather, buffed or corrected-grain leather, and split leather with or without a prior treatment with an impregnating resin mixture using conventional coatings application methods such as, for example, roll coater, curtain coater and spraying methods such as, for example, air-atomized spray, air-assisted spray, airless spray, high volume low pressure spray, and air-assisted airless spray. Additionally, to make the soft, flexible coatings of the present invention, the compositions may be applied to any flexible substrates, including paper, cardboard, paperboard, woven and non-woven textiles, and plastics.

Abbreviations:

CTA=chain transfer agent; AA=acrylic acid; BA=butyl acrylate; BMP=butyl 3-mercaptopropionate; EA=ethyl acrylate; MMA=methyl methacrylate; MMP=methyl 3-mercapto propionate; nDDM=n-dodecyl mercaptan; EHTG=ethylhexyl thioglycolate.

EXAMPLES

The following Experimental Methods were used to test polymer dispersion formulations according to the present invention.

Embossability:

Demonstrates heat and cut-thru resistance, plate cling and Devon print quality for each leather coating. The leather coating compositions were sprayed on 1 square foot of upholstery grade corrected grain leather to give a wet add-on of 140-150 g/sq·m (13-14 g/sq·ft). The coated leather was dried for 30 min in an oven at 60° C., then placed over horizontal drying rods to further dry for at least 16 additional hours at ambient temperature. The following day the coating was embossed with a deep and sharp plate (Devon plate) print in a press applying 200-240 kg/cm$^2$ for 5 seconds with the plate at 90-92° C. Three aspects of embossing were determined: Plate cling, print quality and cut-through resistance. All of these properties were rated subjectively.

Plate cling ratings were from 5 (none, best) where the coating falls from the plate, down to 1 (very severe, worst), in which one can see the coating pulled from the leather and stuck to the plate.

Print quality indicates of how well the pattern is embossed into the coating, and was judged by (a) the smoothness and roundness of the surface between Devon depressions and (b) the sharpness and depth of the Devon depressions. The pieces were examined with a low power microscope (8-50×) to compare for cut-thru and print quality. The quality of the print was rated in detail from 6 (round tops and deep depressions with smooth sides, best) down to 1 (flat tops and shallow depressions with rough sides, worst).

Cut-through resistance defines the ability of the coating to resist a break through of the coating caused by the Devon plate, which is undesirable because nicks in the coating can propagate cracking. The cut-through resistance was rated from 6 (no crust or untreated leather exposure at all, best) down to 1 (severely cut-through, over 60% of depressions are exposed with crust).

The embossability for each coating is compared among events tested within a single controlled series of tests on different pieces of the same leather to eliminate variations in crust, temperature and plate pressure, etc.

Stiffness:

The stiffness of neat polymer was measured by tensile testing as an indicator of stiffness of the coated leather. Films were prepared for the tensile test by diluting the polymer dispersions to 20 wt. % solids, then drying 20 grams in a petrie dish bottom at 48.9° C. (120° F.), giving a film about 0.51 mm (20 mils) in thickness. Pieces of film were cut with a dogbone die having a 0.634 cm (0.25 inch) width and 1.905 cm (0.75 inch) gauge length, then equilibrated in a room at about 23.9° F. (75° F.) and 50% relative humidity for 24 hours. The samples were clamped at two points at a grip distance of 2.54 cm (1 inch) and pulled at a crosshead speed of 25.4 cm (10 inches)/minute. Stiffness was measured as the number of psi (=6.89 kPa) at 100% elongation (M100). Stiffness is considered significant only as compared within a single series of test samples to eliminate variations in temperature, humidity, etc. from day to day.

Yellowing:

Films were prepared as described in "Stiffness", and equilibrated in a room at about 23.9° F. (75° F.) and 50% relative humidity. After equilibration, the films were mounted on a Mylar sheet, and placed in a 120° C. (248° F.) convection oven for 24 hours. After cooling down, the films were examined, and the yellowing of the films was rated from none (best) to very severe (worst).

Synthesis Example 1

Preparation of Multi-Stage Aqueous Emulsion Polymer

To a 3000 ml round bottom flask, fitted with a stirrer, condenser, temperature monitor and a nitrogen gas flush, was added 807 g deionized (DI) water. Unless otherwise indicated the stirrer remained on throughout the synthesis. A monomer premix was prepared from 159 g DI water, 44 g sodium lauryl sulfate (28 wt. %), 504.6 g EA, and 18.3 g AA. The entire monomer premix was transferred to the flask, with a 17 g DI water rinse, followed by a 20 min nitrogen gas sparge. The following solutions were then added sequentially, each one being added at once: 5.2 g of aqueous metal salt co-catalyst containing 0.00629 g of metal salt, 0.15 g ammonium persulfate dissolved in 10.2 g DI water, and a mixture of 0.11 g of sodium bisulfite and 0.50 sodium hydrosulfite dissolved in 25 g DI water. Within 10 minutes, the temperature increased to 80° C. When the temperature peaked, the flask was cooled in an air stream to 70° C. and a mixture of 0.50 g t-butylhydroperoxide in 1.7 g DI water and 0.33 g of sodium formaldehyde sulfoxylate in 8.2 g DI water were added sequentially and the temperature was held for 10 minutes, followed by lowering the temperature to 60° C. in an air stream. When the flask reaches 60° C., the second stage monomer mixture was slowly added over 30 seconds with a 10 g DI water rinse, and the temperature was held for 4 to 5 minutes, followed by adding sequentially chasers of 0.50 g t-butylhydroperoxide in 1.7 g DI water and 0.33 g of sodium formaldehyde sulfoxylate in 8.2 g DI water. The exotherm was monitored, reaching a maximum temperature of ~66° C. in approximately 4-5 mins, followed by cooling in an air stream to 60° C. which is held for 15 minutes. Then, a third chaser was sequentially added of 0.60 g t-butylhydroperoxide in 1.7 g DI water and then 0.40 g of sodium formaldehyde sulfoxylate in 8.2 g DI water, and the mixture was cooled to 40° C. in an air stream. When the temperature fell just below 50° C., a mixture of 8.63 g ZnO and 0.13 g of a 40% in water methacrylic acid copolymer dispersant in 28.9 g DI water was added to the flask over 20 minutes, followed by 0.10 g ammonium bicarbonate in 3.40 g of DI water, sequentially followed with a 13.6 g DI water rinse, followed by holding the temperature at 40° C. while mixing for 1 hour and then adding 3.63 g of ammonium hydroxide in 6.2 g DI water with a 13.6 g DI water rinse and mixing for 10 mins. Finally, the pH was adjusted as needed, and once below 35° C., the product was filtered to yield a polymer dispersion having a 34.7 wt. % solids content, a pH=7.7, and a residual EA content of 0.030 wt. %.

TABLE 1

Polymers

| Polymer | Stage 1/2 Ratio | Stage 1 Composition EA | Stage 1 Composition AA | Stage 2 Composition EA | Stage 2 Composition MMA | Stage 2 AA | Stage 2 CTA | ZnO Eq. |
|---|---|---|---|---|---|---|---|---|
| 1 | 95/5 | 96.5 | 3.5 | 96.5 | 0 | 3.5 | 2 BMP | 0.71 |
| 2 | 95/5 | 96.5 | 3.5 | 96.5 | 0 | 3.5 | 4 BMP | 0.71 |
| 3 | 95/5 | 96.5 | 3.5 | 96.5 | 0 | 3.5 | 6 BMP | 0.71 |
| 4 | 95/5 | 96.5 | 3.5 | 96.5 | 0 | 3.5 | 8 BMP | 0.71 |
| 5 | 90/10 | 96.5 | 3.5 | 96.5 | 0 | 3.5 | 8 BMP | 0.71 |
| 6 | 85/15 | 96.5 | 3.5 | 96.5 | 0 | 3.5 | 8 BMP | 0.71 |
| 7 | 85/15 | 96.5 | 3.5 | 100 | 0 | 0 | 8 BMP | 0.71 |
| 8 | 0/100 | 0 | 0 | 96.5 | 0 | 3.5 | 8 BMP | 0 |
| 9 | 100/0 | 96.5 | 3.5 | 0 | 0 | 0 | 0 | 0.71 |
| 10 | 85/15 | 96.5 | 3.5 | 96.5 | 0 | 3.5 | 5 BMP | 0.71 |
| 11 | 85/15 | 96.5 | 3.5 | 71.5 | 25 | 3.5 | 8 BMP | 0.71 |
| 12 | 85/15 | 96.5 | 3.5 | 96.5 | 0 | 3.5 | 6.2 nDDM | 0.71 |
| 13 | 85/15 | 96.5 | 3.5 | 96.5 | 0 | 3.5 | 3.7 MMP | 0.71 |
| 14 | 85/15 | 96.5 | 3.5 | 96.5 | 0 | 3.5 | 5.9 MMP | 0.71 |
| 15 | 85/15 | 96.5 | 3.5 | 96.5 | 0 | 3.5 | 6.4 EHTG | 0.71 |
| 16 | 85/15 | 96.5 | 3.5 | 96.5 | 0 | 3.5 | 3.7 MMP | 0.71 |
| 17 | 85/15 | 96.5 | 3.5 | 96.5 | 0 | 3.5 | 5.9 MMP | 0.71 |
| Blends (Stage 1 and Stage 2 are separate polymers, mixed) | | | | | | | | |
| A | 78/22 | Polymer D | | Polymer 8 | | — | | 0.70 |
| B | 85/15 | Polymer 10 | | Polymer 8 | | — | | 0.62 |
| B1 | 75/25 | Polymer D | | Polymer 8 | | — | | 0.68 |
| Comparatives | | | | | | | | |
| C | 100/0 | 96.5 | 3.5 | — | — | — | — | 0.25 |
| D | 100/0 | 96.5 | 3.5 | — | — | — | — | 0.90 |

Polymers 1-17 and A-D were prepared according to the method of Synthesis Example 1, except that (i) the ingredients and amounts are as presented in Table 1; and, (ii) in Polymers 16-17 the aqueous metal salt co-catalyst used was 2.5 g of 0.15 wt. % aqueous ferrous sulfate heptahydrate. All values in the table are in parts by weight with the exception of ZnO Eq., which are equivalents of Zn per equivalent of "total" copolymerized acrylic acid in the $1^{st}$ and $2^{nd}$ stages.

Example 1

CTA Ladder—BMP

Leather coating compositions were prepared by admixing the components shown in Table 2, below:

TABLE 2

| Components | Weight (grams) |
|---|---|
| Water | 130 |
| EUDERM ™[1] Black BN pigment dispersion, 23 wt. % solids | 150 |
| EUDERM ™[1] White CBN pigment dispersion, 60 wt. % solids | 20 |
| EUDERM ™[1] Nappa Soft S Filler and flow control agent, mixture of fatty acid esters, 25 wt. % solids | 100 |
| EUDERM ™[1] Duller SN-C Aqueous duller dispersion, silicon dioxide in acrylic dispersion, 25 wt. % solids | 100 |
| Polymer (35 wt. % solids) | 500 |
| Acrysol ™[2] RM-1020 Rheology modifier, 20 wt. % solids | To adjust viscosity |
| Total | 1000 |
| Total Solids | 271 |
| Solids wt. % | 27.1 |

[1]Lanxess Corporation, Leverkusen, Germany
[2]Rohm and Haas Company, Philadelphia, PA The formulations were adjusted to about 20 seconds viscosity (Zahn #2 cup) at room temp using Acrysol RM-1020 rheology modifier and were applied by spray to 1 square foot (0.093 square meter) piece of corrected grain upholstery leather at a wet add-on of 140-150 g/m$^2$ (13-14 g/foot$^2$). The coated leather was dried for 30 min in an oven at 60° C. The leathers were then rated for tack by pressing the coated surface against itself.

On the following day each piece of coated leather was embossed with a Devon plate, as described above. Immediately after embossing, the leather coating was evaluated for plate cling and then for hot tack by pressing the hot coating surface against itself. The cut-through resistance and print quality of leather coating were evaluated under a low power microscope (8-50×). The results are shown in Table 3, below.

TABLE 3

| Polymer | Stiffness (kiloPascal) | Yellowing | Tack | Plate Cling | Hot Tack | Cut-thru Resist | Print |
|---|---|---|---|---|---|---|---|
| C | 462 | slt-mod | slt-mod | 3 | mod-severe | 2-3 | 3-4 |
| D | 951 | mod | vry slt | 3-4 | slt | 6 | 5-6 |
| 1 | 690 | mod | vry slt | 4 | slt | 6 | 5-6 |
| 2 | 641 | mod | vry slt | 4 | slt | 6 | 5-6 |
| 3 | 627 | slt-mod | vry slt | 4 | slt | 6 | 5-6 |
| 4 | 641 | slt | vry slt | 4 | slt | 6 | 5-6 |

As shown in Table 3, above, increasing Zinc content in Examples 1-4 will increase the stiffness of the polymer compared to polymer C, but will lower the tack/hot tack and improve the plate cling, cut-thru resistance and print quality. Comparing polymer D and Examples 1-4, the incorporation of acrylic oligomers effectively softens the polymers, reducing stiffness, without impairing low tack. Further, as shown in Examples 3-4, increasing the amount of CTA in the acrylic oligomer does not appear to change the softness of the final polymers, but it does improve the yellowing property of the polymers.

Example 2

Oligomer Composition and Ratio Variants

Leather coating compositions were prepared by admixing the components shown in Table 4, below:

TABLE 4

| Components | Weight (grams) |
|---|---|
| Water | 130 |
| EUDERM ™[1] Black BN pigment dispersion | 150 |
| EUDERM ™[1] White CBN pigment dispersion | 20 |
| EUDERM ™[1] Nappa Soft S pigment dispersion | 100 |
| EUDERM ™[1] Duller SN-C pigment dispersion | 100 |
| Polymer (35 wt. % solids) | 500 |
| Acrysol ™[2] RM-1020 Rheology Modifier | To adjust viscosity |
| Total | 1000 |
| Total Solids | 271 |
| Solids wt. % | 27.1 |

[1]Lanxess Corporation, Leverkusen, Germany. See Table 2, above.
[2]Rohm and Haas Company, Philadelphia, PA. See Table 2, above.

The formulations were adjusted to about 20 seconds viscosity (Zahn #2 cup) at room temp using Acrysol RM-1020 rheology modifier and were applied by spray to 1 square foot (0.093 square meter) piece of corrected grain upholstery leather at a wet add-on of 140-150 g/m$^2$ (13-14 g/foot$^2$). The coated leather was dried for 30 min in an oven at 60° C. The leathers were then rated for tack by pressing the coated surface against itself.

On the following day, each coated leather piece was embossed with a Devon plate, as described above. Immediately after embossing, the leather coating was evaluated for plate cling and then for hot tack by pressing the hot coating surface against itself. The cut-through resistance and print quality of the leather coating were evaluated under a low power microscope (8-50×). The results from a single test series are shown in Table 5, below.

TABLE 5

| Polymer | Stiffness (kilo-Pascal) | Yellowing | Tack | Plate Cling | Hot Tack | Cut-thru Resist | Print |
|---|---|---|---|---|---|---|---|
| C | 427 | slt-mod | slt-mod | 3 | mod-severe | 1 | 3 |
| D | 972 | mod | vry slt | 4 | slt | 4 | 5 |
| 5 | 579 | none | vry slt | 3-4 | slt | 4 | 3-4 |
| 6 | 476 | none | vry slt | 4 | slt | 4 | 4 |
| 7 | 448 | none | vry slt | 4 | slt | 4 | 4 |
| 10 | 448 | none | vry slt | 3-4 | slt | 4 | 4 |
| 11 | 469 | none | vry slt | 3-4 | slt | 4 | 4 |

As shown in Examples 6, 7, 10 and 11, increasing the amount of acrylic oligomer will increase the softness of the polymers without hurting embossing properties (compare Example 5). The acrylic oligomer dramatically improves hot tack and cut through resistance in any example (vs. polymer C) and dramatically softens the polymer without impairing embossing properties (vs. polymer D).

Example 3

CTA Variants

Leather coating compositions were prepared by admixing the components shown in Table 6, below:

TABLE 6

| Components | Weight (grams) |
|---|---|
| Water | 130 |
| EUDERM ™[1] Black BN pigment dispersion | 150 |

TABLE 6-continued

| Components | Weight (grams) |
|---|---|
| EUDERM ™[1] White CBN pigment dispersion | 20 |
| EUDERM ™[1] Nappa Soft S pigment dispersion | 100 |
| EUDERM ™[1] Duller SN-C pigment dispersion | 100 |
| Polymer (35 wt. % solids) | 500 |
| Acrysol ™[2] RM-1020 Rheology Modifier | To adjust viscosity |
| Total | 1000 |
| Total Solids | 271 |
| Solids wt. % | 27.1 |

[1]Lanxess Corporation, Leverkusen, Germany. See Table 2, above.
[2]Rohm and Haas Company, Philadelphia, PA. See Table 2, above.

The formulations were adjusted to about 20 seconds viscosity (Zahn #2 cup) at room temp using Acrysol RM-1020 rheology modifier and were applied by spray to 1 square foot (0.093 square meter) piece of corrected grain upholstery leather at a wet add-on of 140-150 g/m$^2$ (13-14 g/foot$^2$). The coated leather was dried for 30 min in an oven at 60° C. The leathers were then rated for tack by pressing the coated surface against itself.

On the following day, each coated leather piece was embossed with a Devon plate, as described above. Immediately after embossing, the leather coating was evaluated for plate cling and then for hot tack by pressing the hot coating surface against itself. The cut-through resistance and print quality of leather coating were evaluated under a low power microscope (8-50×). The results from a single test series are shown in Table 7, below.

TABLE 7

| Polymer | Stiffness (kilo-Pascal) | Yellowing | Tack | Plate Cling | Hot Tack | Cut-thru Resist | Print |
|---|---|---|---|---|---|---|---|
| C | 441 | slt-mod | slt-mod | 2-3 | mod-severe | 3 | 3 |
| D | 1,007 | mod | vry slt | 3 | slt | 5-6 | 5 |
| 10 | 483 | none | vry slt | 3 | slt | 5 | 4-5 |
| 6 | 455 | none | vry slt | 3 | slt | 5 | 4 |
| 12 | 538 | none | vry slt | 3 | slt | 5 | 4-5 |
| 13 | 469 | none | vry slt | 3 | slt | 4-5 | 4-5 |
| 14 | 400 | none | vry slt | 3-4 | slt | 5 | 5 |
| 15 | 427 | slight | vry slt | 3-4 | slt | 5 | 4-5 |
| 16 | 503 | none | vry slt | 3-4 | slt | 5-6 | 5-6 |
| 17 | 469 | none | vry slt | 3-4 | slt | 5-6 | 5-6 |

As shown in Table 7, each inventive Example provides softer polymers and good embossing properties. In addition, as shown in Examples 13-14 and 16-17, MMP appears to be a particularly effective CTA.

Example 4

Blending Vs "In-Situ" Multi-Stage Polymerization

Leather coating compositions were prepared by admixing the components shown in Table 8, below:

TABLE 8

| Components | Weight (grams) |
|---|---|
| Water | 130 |
| EUDERM ™[1] Black BN pigment dispersion | 150 |
| EUDERM ™[1] White CBN pigment dispersion | 20 |

TABLE 8-continued

| Components | Weight (grams) |
|---|---|
| EUDERM ™[1] Nappa Soft S pigment dispersion | 100 |
| EUDERM ™[1] Duller SN-C pigment dispersion | 100 |
| Polymer (35 wt. % solids) | 500 |
| Acrysol ™[2] RM-1020 Rheology Modifier | — |
| Total | 1000 |
| Total Solids | 271 |
| Solids wt. % | 27.1 |

[1]Lanxess Corporation, Leverkusen, Germany. See Table 2, above.
[2]Rohm and Haas Company, Philadelphia, PA. See Table 2, above.

The formulations were adjusted to about 20 seconds viscosity (Zahn #2 cup) at room temp using Acrysol RM-1020 rheology modifier and were applied by spray to 1 square foot (0.093 square meter) piece of corrected grain upholstery leather at a wet add-on of 140-150 g/m² (13-14 g/foot²). The coated leather was dried for 30 min in an oven at 60° C. The leathers were then rated for tack by pressing the coated surface against itself.

On the following day, each coated leather piece was embossed with a Devon plate, as described above. Immediately after embossing, the leather coating was evaluated for plate cling and then for hot tack by pressing the hot coating surface against itself. The cut-through resistance and print quality of leather coating were evaluated under a low power microscope (8-50×). The results from a single test series are shown in Table 9, below.

TABLE 9

| Polymer | Stiffness (kiloPascal) | Yellowing | Tack | Plate Cling | Hot Tack | Cut-thru Resist. | Print |
|---|---|---|---|---|---|---|---|
| C | 448 | slt-mod. | slt-mod | 2-3 | mod-severe | 3 | 2-3 |
| D | 1,007 | mod. | vry slt | 3 | slt | 6 | 5 |
| 7 | 448 | none | vry slt | 3-4 | slt | 5 | 5 |
| 6 | 483 | none | vry slt | 3-4 | slt | 5-6 | 5 |
| 8 | — | — | — | — | — | — | — |
| 9 | 690 | mod. | vry slt | — | — | — | — |
| Blend A | 427 | none | vry slt | 3-4 | slt | 5 | 5 |
| Blend B | 441 | none | vry slt | 3-4 | slt | 5 | 4 |
| Blend B1 | 248 | none | vry slt | 3-4 | slt | 4-5 | 4-5 |

As shown in Table 9, the acrylic oligomers either as blends in Blend A, Blend B or Blend B1 with Zinc crosslinked carboxylic acid group containing acrylic polymer or as a stage in multistage polymerization of Zinc crosslinked carboxylic acid group containing acrylic polymer in Examples 6, 7 and 9 provide excellent yellowing and good embossing properties in soft feel coatings.

We claim:

1. A composition comprising one or more acrylic oligomer having a weight average molecular weight of 20,000 or less, and one or more aqueous carboxylic acid group containing acrylic polymer having a glass transition temperature (Tg) of ≦10° C. (10° C. or less) and that has been crosslinked with one or more divalent metal, wherein the Tg of the acrylic oligomer is equal to or less than the Tg of the aqueous polymer.

2. A composition as claimed in claim 1, wherein the aqueous carboxylic acid group containing acrylic polymer comprises the polymerization product of one or more acrylic monomer and from 0.5 to 10 wt. % of one or more carboxylic acid group containing ethylenically unsaturated comonomer, based on the total weight of monomers polymerized to make the carboxylic acid group containing acrylic polymer.

3. A composition as claimed in claim 1, wherein the acrylic monomer used to make the aqueous carboxylic acid group containing acrylic polymer is chosen from ethyl acrylate (EA), butyl acrylate (BA), ethylhexyl acrylate (EHA), butyl methacrylate, ethylhexyl methacrylate, and mixtures thereof.

4. A composition as claimed in claim 1, wherein the Tg of the aqueous carboxylic acid group containing acrylic polymer is or −50° C. or more.

5. A composition as claimed in claim 1, wherein the Tg of the acrylic oligomer is ≧10° C. less than the Tg of the aqueous carboxylic acid group containing acrylic polymer.

6. A composition as claimed in claim 1, wherein the aqueous carboxylic acid group containing acrylic polymer and the acrylic oligomer comprise a multi-stage copolymer having the carboxylic acid group containing acrylic polymer as a first stage and the acrylic oligomer as the second or final stage.

7. A composition as claimed in claim 1, wherein the divalent metal for the aqueous carboxylic acid group containing acrylic polymer results from crosslinking the aqueous carboxylic acid group containing acrylic polymer with a divalent metal crosslinker chosen from a divalent metal oxide, divalent metal hydroxide, divalent metal carbonate, and mixtures thereof.

8. A composition as claimed in claim 7, wherein the divalent metal crosslinker is chosen from zinc oxide and zinc hydroxide.

9. A method of making the composition as claimed in claim 1 comprising
    polymerizing as a first stage of a multi-stage polymerization an aqueous emulsion monomer mix containing one or more acrylic monomer and one or more carboxylic acid group containing ethylenically unsaturated monomer to form the aqueous carboxylic acid group containing acrylic polymer having a glass transition temperature (Tg) of ≦10° C.,
    in a second or a subsequent stage, adding a second monomer mix comprising a chain transfer agent and one or more monomer and polymerizing the second monomer mix in the presence of a chain transfer agent to form the acrylic oligomer having a weight average molecular weight of 10,000 or less and a Tg equal to or less than the Tg of carboxylic acid group containing acrylic polymer, and,
    adding one or more divalent metal crosslinker and crosslinking the carboxylic acid group containing acrylic polymer.

10. A coating made from the composition of claim 1 on a substrate chosen from leather, paper, cardboard, paperboard, woven textiles, non-woven textiles, and plastics.

* * * * *